United States Patent
Davidson

(10) Patent No.: US 10,693,289 B2
(45) Date of Patent: Jun. 23, 2020

(54) DC BREAKER

(71) Applicant: General Electric Technology GmbH, Baden (CH)

(72) Inventor: Colin Charnock Davidson, Stafford (GB)

(73) Assignee: General Electric Technology GmbH, Baden (CH)

( * ) Notice: Subject to any disclaimer, the term of this patent is extended or adjusted under 35 U.S.C. 154(b) by 285 days.

(21) Appl. No.: 15/541,614

(22) PCT Filed: Dec. 18, 2015

(86) PCT No.: PCT/EP2015/080580
§ 371 (c)(1),
(2) Date: Jul. 5, 2017

(87) PCT Pub. No.: WO2016/110401
PCT Pub. Date: Jul. 14, 2016

(65) Prior Publication Data
US 2018/0026435 A1    Jan. 25, 2018

(30) Foreign Application Priority Data

Jan. 5, 2015    (EP) ..................................... 15150074

(51) Int. Cl.
*H02H 3/00* (2006.01)
*H02H 3/20* (2006.01)
(Continued)

(52) U.S. Cl.
CPC ............. *H02H 3/202* (2013.01); *H01H 9/548* (2013.01); *H01H 33/596* (2013.01); *H02H 3/02* (2013.01); *H02B 13/02* (2013.01)

(58) Field of Classification Search
None
See application file for complete search history.

(56) References Cited

U.S. PATENT DOCUMENTS 3,678,335 A    7/1972    Pucher
8,779,318 B2 *  7/2014    Espeseth ................. H01H 3/02
                                                  218/124
(Continued)

FOREIGN PATENT DOCUMENTS

CN    102656656 A    9/2012
CN    103208753 A    7/2013
(Continued)

OTHER PUBLICATIONS

International Search Report corresponding with international application No. PCT/EP2015/080580, dated Mar. 8, 2016.
(Continued)

*Primary Examiner* — Stephen W Jackson
(74) *Attorney, Agent, or Firm* — Eversheds Sutherland (US) LLP

(57) ABSTRACT

A DC breakers and in particular to DC breaker modules suitable for use in a high voltage DC circuit. The breaker module comprises at least a first breaker circuit (enclosed within a conductive enclosure. The enclosure is configured such that the first breaker circuit can be connected (in an electrical path with a circuit external to the conductive enclosure. The conductive enclosure is further configured to be connected to a node of the electrical path such that, in use, the conductive enclosure is at the same voltage potential as the node of the circuit path. The conductive enclosure may be a standardised size and may, for example, be a standard shipping container. The methods and apparatus of the present application allow a DC breaker to be formed from modules that can be built, tested, transported and installed in a standardised enclosure.

15 Claims, 2 Drawing Sheets

(51) Int. Cl.
    *H01H 33/59*     (2006.01)
    *H01H 9/54*     (2006.01)
    *H02H 3/02*     (2006.01)
    *H02B 13/02*     (2006.01)

(56) References Cited

U.S. PATENT DOCUMENTS

| | | | |
|---|---|---|---|
| 9,246,324 B2 * | 1/2016 | Skarby | H01H 9/542 |
| 2008/0060790 A1 | 3/2008 | Yates | |
| 2008/0259531 A1 | 10/2008 | Suzuki et al. | |

FOREIGN PATENT DOCUMENTS

| | | |
|---|---|---|
| CN | 203387412 U | 1/2014 |
| CN | 103632895 A | 3/2014 |
| WO | 2012/100831 A1 | 8/2012 |
| WO | 2013/071980 A1 | 5/2013 |
| WO | 2013/093066 A1 | 6/2013 |
| WO | 2013093066 A1 | 6/2013 |

OTHER PUBLICATIONS

Machine Translation and First Office Action and Search issued in connection with corresponding CN Application No. 201580072534.8 dated Jun. 5, 2018.

\* cited by examiner

DC BREAKER

TECHNICAL FIELD

This invention relates to methods and apparatuses for protecting a high voltage direct current (HVDC) system in the event of a short circuit or fault. In particular it relates to the design and assembly of HVDC circuit breakers.

BACKGROUND

High Voltage Direct Current (HVDC) electric power systems can provide an economic and efficient alternative to High Voltage Alternating Current (HVAC) power systems, particularly when transporting power over long distances (>50 km), where HVDC generally has lower losses and can provide increased transmission capacity.

HVDC systems may also be used to facilitate the transfer of power between asynchronous networks and networks operating at different AC frequencies and/or to help stabilise AC networks.

One particular area of interest is the use of HVDC systems to transport power from remote renewable energy sources such as from offshore wind or hydro farms to the mainland.

One challenge with the use of DC systems over AC is breaking the current in the event of a power surge or fault. In an AC system the current goes through zero every half cycle and thus a mechanical breaker can be operated at or near a current zero to avoid any significant arcing as the breaker opens. However in a DC system there is no such break in current.

Mechanical breakers that are capable of effectively breaking DC currents are known, however they are often too slow for modern power systems, taking several tens of milliseconds. Breakers using semiconductor switches can overcome this problem, however semiconductor switches tend to have high conduction losses and the losses associated with a semiconductor breaker can be as high as 30% of the losses of a voltage source converter station.

SUMMARY OF THE INVENTION

One form of HVDC circuit breaker that addresses these issues is the so called 'hybrid' breaker, for example having a structure as described in WO2012/100831 or WO2013/071980. The hybrid breaker combines mechanical and semiconductor components to provide a fast, efficient breaker suitable for the demands of modern HVDC systems. The principles of a hybrid breaker are illustrated with respect to FIG. 1. FIG. 1 illustrates a hybrid breaker 100 that is split into two current paths connected in parallel, consisting of a main branch 104 and an auxiliary branch 102. The auxiliary branch 102 comprises a plurality of semiconductor switches, such as insulated-gate bipolar transistors (IGBTs) 106, connected in series. Surge arresters 108 are connected in parallel with the IGBTs 106. The main branch 104 contains a mechanical breaker 110 and a commutation switch that may comprise one or more IGBTs 112. As will be described in more detail below the auxiliary branch 102 will comprise a sufficient number of IGBTs to break the circuit in a fault situation and thus there may be many tens or even hundreds of switches in series in practice. FIG. 1 just shows a few switch elements for clarity. The commutation switch 112 will in practice comprise significantly fewer IGBTs.

During normal operation the mechanical breaker 110 and commutation switch 112 of the main branch are both closed, i.e. conducting. The semiconductor switches 106 of the auxiliary branch would typically be open, i.e. non-conducting, during normal operation (but in some applications the semiconductor switches may also be closed during normal operation). During normal operation the current thus flows through the main branch 104. In the event of a fault, the semiconductor switches of 106 the auxiliary branch are closed and the commutation switch 112 is opened, thus diverting current through away from the main branch to the auxiliary branch 102 and allowing the mechanical breaker 110 of the main branch to be opened without significant current passing through it. Once the mechanical breaker is opened, the auxiliary branch of IGBTs 106 is then opened to break the circuit. It will therefore be appreciated that the current path in normal operation is via the mechanical breaker 110 and the relatively low number of IGBTs of the commutation switch of the main branch. The power losses associated with such a path is therefore relatively low. Thus the low power losses associated with mechanical breakers during normal operation are combined with the speed and stability of an IGBT switch bank to produce a fast, efficient HVDC breaker.

In use the HVDC breaker will be installed at a suitable point in the DC grid, e.g. with an associated HVDC converter or within an HVDC substation. Conventionally, to provide electromagnetic interference (EMI) shielding and to provide a suitably safe and clean environment the whole DC breaker will be assembled and installed within a substantially sealed and shielded structure. This does however require the use of purpose built structures which necessarily are quite large to house the breaker with the necessary electrical clearances. This can add to the expense of the DC breaker and the requirement for large structures can be problematic in some applications such as for off-shore installations.

Embodiments of the invention thus relate to DC breakers that mitigate at least some of the above mentioned problems.

Thus according to a first embodiment of the invention there is provided a DC breaker module suitable for use in a high voltage DC circuit comprising at least a first breaker circuit enclosed within a conductive enclosure, the enclosure being configured such that, in use, the first breaker circuit can be connected in an electrical path with a circuit external to the conductive enclosure. The conductive enclosure is further configured to be connected to a node of the electrical path such that, in use, the conductive enclosure is at the same voltage potential as the node of the circuit path.

Embodiments of the present invention thus relate to a modularised HVDC circuit breaker system that allows an HVDC breaker to be built, transported and installed as a series of independent modules, without the need for a dedicated purpose built building for housing the breaker. The use of separate modules facilitates easy transport and assembly and, as will be described below, each module is self contained and in use may require no further special containment, thus avoiding the need for large specialised structures.

One skilled in the art will appreciate that DC converters are usually installed in purpose built buildings, often referred to as valve halls, in order to contain the electromagnetic interference (EMI) generated by the convertor and to provide a clean environment in order to prevent excessive dust build-up due to electrostatic precipitation caused by the high DC voltages. As mentioned above, the conventional approach is that DC breakers should be located in similar structures.

It has been appreciated by the present inventors that these factors are far less relevant for a DC breaker than for a DC converter. This is because during normal operation (i.e. when the breaker is closed), there is nothing that should generate EMI in the enclosure of an HVDC breaker and even when the breaker opens, EMI is only generated transiently.

With respect to the build-up of dust, it has been appreciated that electrostatic precipitation can be significantly reduced by placing the DC breaker circuit in a conductive enclosure, for example a metallic enclosure, wherein the enclosure is electrically connected to a suitable node of the breaker circuit and thereby, in use, operates at the HVDC line potential such that during normal operation (with the breaker closed) the conductive, e.g. metallic, enclosure is at the same voltage potential as the breaker. The conductive enclosure may be configured to be connected to either an input node of the first breaker circuit or an output node of the first breaker circuit.

The result of the breaker being at the same potential as the enclosure is that, the breaker is contained within an environment where the local DC electric fields are low and therefore, whilst the breaker is closed, there is no mechanism for dust to accumulate on the DC breaker equipment by electrostatic precipitation. In addition, ensuring that the enclosure is at the same voltage potential as the breaker when closed can reduce the requirements for electrical clearance between the active charged elements of the breaker circuit and the enclosure, i.e. the separation distance. In normal use (with the breaker circuit closed) the enclosure will thus be substantially at the same potential as the elements of the breaker circuit and thus the requirements for electrical clearance are minimal.

The electrical clearance required between the elements of the breaker circuit and the enclosure is thus determined by the voltages associated with the breaker circuit operating in a fault condition.

In the event of a fault the breaker circuit will operate as described above. Once the breaker is fully open and the fault is cleared, then there will be a voltage difference between the input and output nodes of the breaker circuit, which may be up to the nominal rated voltage for the breaker circuit. However, as will be understood by one skilled in the art, as the breaker opens (i.e. for a few milliseconds during fault clearing) the voltage experienced, which is referred to as the transient interruption voltage (TIV), may be around 50% higher than this nominal voltage. As the conductive enclosure is held at the same potential as part of the breaker circuit the maximum expected voltage difference between the enclosure and the breaker circuit will thus be equal to the TIV of the breaker circuit. It is thus the TIV which determines the electrical clearance that is required between the enclosure and the breaker circuit, as will be discussed in more detail below. By dividing the DC breaker into a series of individual modules, each module having a breaker circuit in a conductive enclosure that, in use, is held at the same voltage potential as a node of the breaker circuit, the voltages of interest for each module are relatively low and thus the electrical clearance for each individual module can be relatively low.

In some embodiments a separate disconnector switch can be placed in series with the breaker. Disconnector switches are known in the art and may be typically be placed in series with a breaker to provide a more permanent disconnection of the network once the breaker has opened. If the breaker is to be left open for any length of time, the disconnector switch can be opened, which can equalise the voltages on the breaker circuit and the conductive enclosure. The use of a disconnector switch limits the amount of insulating support required within the module, since the insulating support for the DC breaker equipment within the breaker is only required to withstand any voltage difference between the conductive enclosure and the breaker circuit for a short period time, e.g. it will have to withstand the TIV during the breaker opening and fault clearing, but this may take of the order of milliseconds. After the TIV there will be a voltage difference of up to the nominal voltage for the breaker circuit but the use of a disconnector switch may ensure that there is only a short period of time (say seconds or minutes) between the breaker being opened and the disconnector switch being opened.

In the case of a breaker suitable for breaking the nominal voltages typically found in an HVDC system, housing the full breaker circuit in a single conductive enclosure, e.g. a single metallic enclosure, would require a large conductive enclosure and may be impractical for at least some applications. This is because in the case of a typical 320 kV DC system, the electrical clearance that would be required may lead to an impractically large metallic enclosure.

Therefore, according to an embodiment of the current invention, an HVDC breaker, for instance such as that illustrated in FIG. 1, is divided into a plurality of smaller modules connected together in series. Each module contains a breaker circuit housed in a conductive enclosure. Each breaker module is capable of acting as a circuit breaker in its own right, with a rated voltage that is lower than the nominal voltage of an HVDC system. Breakers with rated voltages appropriate for HVDC systems can then be built up by electrically connecting together a number of modules in series. It is envisaged that modules may be built in a range of sizes, however appropriate sizes for some modules may be 83 kV and 167 kV. As a result, the commonly-used HVDC voltages of 320 kV and 500 kV can easily be created from two or three 167 kV modules connected in series respectively. Intermediate voltages of 150 kV, 250 kV and 400 kV can also be achieved by using a mixture of 83 kV and 167 kV modules.

By dividing the breaker up in this way, the electrical clearance required between each breaker circuit and its associated enclosure when the breaker is in the open position is relatively small. For an 83 kV or 167 kV breaker module, the respective TIVs would be 125 kV and 250 kV. The electrical clearances required for TIVs of this size are low enough for the breaker modules to fit into shipping containers that may be of a standard size as would be understood by one skilled in the art.

The DC breaker module may therefore be housed in a structure that conforms to the dimensions of an ISO standard shipping container. For instance the conductive enclosure may be formed within or from a shipping container. At least one wall of the conductive enclosure may form at least part of a shipping container.

In some embodiments the DC breaker module may further comprise a second breaker circuit within the conductive enclosure, with the first and second breaker circuits being connected in series. The conductive enclosure may be configured such that, in use, the second breaker circuit can be connected in said electrical path with the first breaker circuit. In such embodiments the conductive enclosure may be configured to be connected to a node at a connection point between the first and second breaker circuits.

Each DC breaker module may therefore effectively comprise components necessary for installation as a complete breaker circuit for its rated voltage, e.g. suitably rated components of both the main and auxiliary branches for a hybrid breaker, and higher rated breakers can be formed by connecting the modules in series. However it would be possible, if desired, to split components of a breaker circuit between multiple enclosures. For example components for the main branch could be located in one enclosure and components for an auxiliary branch in another enclosure.

The conductive enclosure may comprise at least one connection site, such as an aperture, for connecting electrical bushings to allow an electrical connection between the first breaker circuit in the electrical path with a circuit external to the metallic enclosure through the walls of the metallic enclosure.

The module may also comprise at least one insulating support member for supporting the breaker circuit within the conductive enclosure in use. In some embodiments the breaker circuit and/or conductive enclosure may comprise one or more mounting sites for mounting at least one removable bracing member for supporting the breaker circuitry when not in use, for example during transportation.

In use corona rings may be fitted to the outside of the metallic enclosure.

The first breaker circuit may comprise a hybrid breaker circuit comprising a main path and an auxiliary path wherein the auxiliary path comprises a plurality of semiconductor switches connected in series and the main path comprises one or more semiconductor switches and a mechanical breaker connected in series. The module may comprise at least one mounting point on the outside of the conductive enclosure for mounting one or more surge arresters on the outside of the conductive enclosure in parallel with the plurality of semiconductor switches of the auxiliary path. It will of course be appreciated that other forms of breaker circuits may also be used, for example a fully solid-state breaker, an alternative arrangement of a hybrid breaker or any type of mechanical breaker. The principles of embodiments of the invention are generally applicable using any suitable type of breaker circuit that may be implemented or developed.

Aspects of the invention also relate to a DC circuit breaker suitable for use in a high voltage DC system comprising a plurality of DC breaker modules as described above wherein the plurality of DC breaker modules are connected in series.

In another aspect there is provided a method of forming a DC breaker. The method may comprise taking a plurality of DC breaker modules, each DC breaker module comprising a DC breaker circuit in a conductive enclosure, connecting the DC breaker circuits of said DC breaker modules in series; and connecting each conductive enclosure of a DC breaker module to a node of the respective DC breaker circuit.

Embodiments have a number of advantages, principally that the use of self-contained modules of a manageable size removes the need to build a dedicated hall to contain the circuit breaker, thus saving considerable cost. Furthermore, each assembled module can be properly tested in a factory setting before being shipped, with minimal disturbance during transportation, and installed on site. This is in contrast to a traditional installation, where the breaker has to be assembled onsite before testing. Furthermore, embodiments of the invention offer advantages in terms of standardising DC circuit breaker equipment because modules of a standard size can be produced and used with minimal modification in a range of circuit sizes and applications. It will be appreciated however that for some applications, modules could also be manufactured for a specific enclosure and each module sized according to the specific installation. As noted above, it is envisaged that some modules will be sized to fit into a container with dimensions conforming to a shipping container, thus facilitating easy transport.

BRIEF DESCRIPTION OF THE DRAWINGS

The invention will now be described by way of example only, with reference to the accompanying drawings, of which.

DETAILED DESCRIPTION OF THE EMBODIMENTS

Figure 2A:
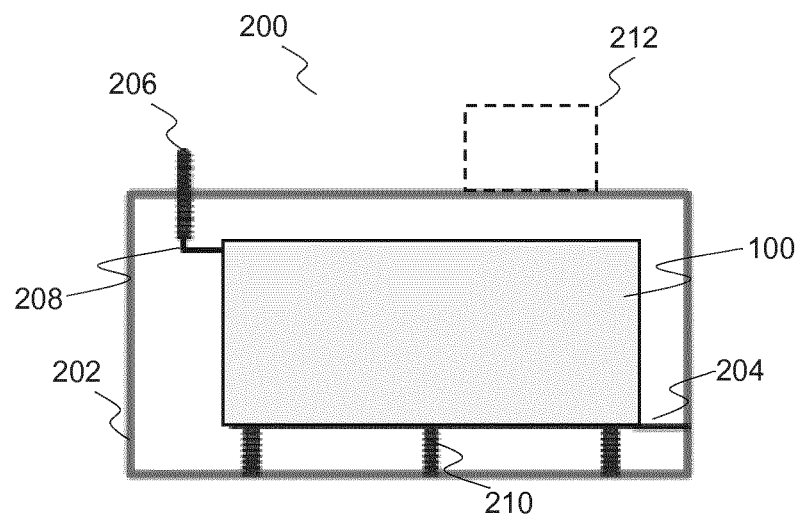
FIG. 2a illustrates a single breaker module.

One embodiment of the invention is shown in FIG. 2a which shows a breaker module 200 comprising a conductive enclosure 202 which encloses a breaker circuit generally indicated 100.

Figure 1:
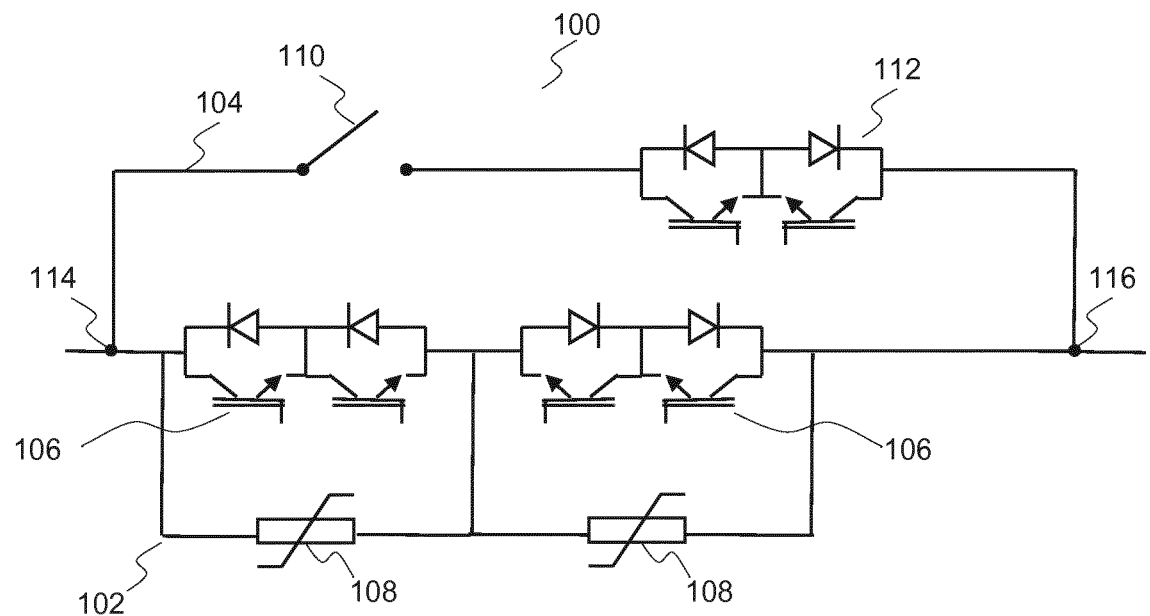
FIG. 1 illustrates a prior art example of an HVDC breaker circuit.

In the embodiment shown in FIG. 2a, the breaker circuit may be a hybrid breaker circuit, i.e. the breaker circuit may be of the form illustrated in FIG. 1 with a main path and an auxiliary path within breaker circuit 100. The breaker circuit 100 can thus be seen as a complete DC breaker, but for a relatively lower rated voltage than would be required for a full HVDC system. For example the breaker circuit 100 may have a rated voltage of the order of 83 kV or so, say in the range of 60 kV-100 kV. It will of course be appreciated however that the breaker circuit may be rated for other nominal voltages. In this sense, the term 'rated voltage' shall be taken to refer to the nominal voltage that breaker circuit 100 is capable of withstanding between its terminals after a fault has been cleared. Thus a rated voltage of 83 kV refers to a breaker circuit suitable of withstanding a nominal voltage of 83 kV after fault clearing and operating as a breaker for such a voltage. In the case of a hybrid breaker, a rated voltage of 83 kV means that breaker circuit 100 contains sufficient IGBTs 106 in the auxiliary path to safely break a DC fault current on an 83 kV nominal system. As will be explained below a full rated DC breaker can thus be formed by connecting a suitable number of breaker modules together in series.

The conductive enclosure 202, which in this example is a metallic enclosure, is configured to be connected to a node of the breaker circuit 100 via an electrical connection 204 such that, when in use, the metallic enclosure 202 is at the same voltage potential as the corresponding node of the breaker circuit 100. Connection 204 may be connected to the input node 114 or the output node 116 of breaker circuit 100. Alternatively, connection 204 may be connected to some other node that is at a voltage potential associated with breaker circuit 100. In all cases, the connection 204 ensures that in normal use, the metallic enclosure 202 is at essentially the same potential as the relevant node of the breaker circuit. The breaker circuit 100 is in an embodiment completely enclosed by the enclosure 202, i.e. the enclosure is substantially closed on all sides to provide environmental protection for the enclosed circuitry—although in use there will be at least some electrical connections that pass through the walls of the enclosure and the enclosure may be provided with one or more doors to permit access for maintenance or commissioning. In an embodiment, the conductive material of the enclosure is arranged so that the breaker circuitry is substantially completely surrounded by conductive material such that, in use, the breaker circuit is surrounded by material at a similar potential to the breaker. The conductive material may be continuous over at least part of the enclosure, e.g. a continuous metal sheet or in some embodiments at least part of the enclosure could be provided by a conductive mesh.

The enclosure 202 includes one or more wall bushings 206 that allow a connection 208 to pass through conductive enclosure 202 such that the breaker module can be connected in an electrical path with a circuit external to the enclosure, e.g. in series with at least one other breaker module. For the breaker module shown in FIG. 2a, the conductive enclosure itself may be tied to one end of the DC breaker circuit, for example node 114 illustrated in FIG. 1, via connection 204. As node 114 is connected to the enclosure, and thus at the same potential, no bushing is required at this connection site. Only a single bushing may be required (for making a connection with node 116) as shown in FIG. 2a. Alternatively, two bushings can be used to connect the breaker module 200 to an external circuit, these may be placed at either end of the container, or at some other position on metallic enclosure 202. The choice of positioning of the bushings 206 may be determined by how they are to be installed on site, for instance the bushings 206 may be located at opposite ends of the container in order to allow one or more modules to be conveniently connected whilst being placed side by side. Alternatively, a first bushing may be positioned to allow a connection to be made through the upper wall of metallic enclosure 202 and a second bushing may be positioned to allow a connection to be made through the floor of metallic enclosure 202, in order to enable the modules to be stacked whilst in use.

Although the one or more bushings 206 may be fitted to module 200 in the factory setting, particularly for testing of the module, in order to prevent damage, the bushings may be removed for transport, and reattached on site. In this case, the bushings 206 may be replaced by blanking plates during transportation of the module.

In an alternative embodiment, a plurality of possible 'bushing sites' may be provided on metallic enclosure 202 each of which could be used to fit a bushing and provide a connection point 208 between the breaker module and the external circuit. The purpose of providing a plurality of bushing sites is to provide a range of possible connection points 208 to enable the modules to be capable of being installed in a wide variety of installation arrangements. This means that the external connections of the module do not need to be determined at the point at which the module is fabricated and instead the connections can be determined at the point of installation and as such the design of the breaker module can become highly standardised. In such a case, blanking plates may be used to seal any connection points that are not used in the final breaker arrangement.

Within the enclosure one or more insulating supports 210 support the breaker circuit 100 in a defined position within the enclosure. Conveniently the insulating supports may simply comprise supports that lift the breaker circuitry from the floor of conductive enclosure 202, but in some embodiments supports from the roof or sidewalls may additionally or alternatively be provided. In some embodiments the breaker module may be capable of being installed in different orientations, i.e. a particular wall of the enclosure could act as a floor or as a side wall depending on orientation. In other embodiments however the breaker module may be arranged with a defined floor and should be installed in regard to a defined "up direction". In any event the insulating supports are arranged to support the breaker circuit with sufficient electrical clearance between the breaker circuitry and the walls of metallic enclosure 202.

Thus the insulating supports 210 support the breaker circuit 100 far enough away from the walls of the enclosure such that at all points surrounding breaker circuit 100, the gap between breaker circuit 100 and the metallic enclosure 202 is at least as large as the electrical clearance required, as will be described in more detail below. In other words the breaker circuit 100 is arranged within the enclosure to meet a predetermined minimum electrical clearance, as will be appreciated by one skilled in the art.

It has been appreciated by the present inventor(s) however that by ensuring that breaker circuits of modules according to embodiments of the present invention have relatively modest voltage ratings, say of the order of 80 kV or so, and that the conductive enclosure is arranged to be at the same potential as a node of the breaker circuit, then the required electrical clearance is relatively low. Thus it is possible for the breaker module to be installed in an enclosure that is conveniently sized for fabrication, transportation and installation.

The electrical clearances required may be calculated based on the Transient Interruption Voltage (TIV) of the breaker, which is normally defined as around one and a half (1.5) times the nominal voltage. As noted above, for an 83 kV or 167 kV breaker module, the respective TIVs are relatively low at 125 kV and 250 kV and this means that the relevant clearance can be achieved in a metallic enclosure which is not too large. In particular the conductive enclosure may be arranged to be the size of a standard shipping container.

In some embodiments therefore, the conductive, e.g. metallic, enclosure 202 may therefore have external dimensions comparable or compatible with a shipping container. In some embodiments the enclosure 202 may comprise a shipping container. For example the conductive enclosure could comprise a metallic walled shipping container. The shipping container could be a standard shipping container having, for example, a single walled metallic structure and/or could comprise a container formed from a plurality of material layers, at least one of which is sufficiently conductive around the whole enclosure. In some embodiments however the conductive enclosure 202 may be a separate structure which is housed within a shipping container.

The shipping container may be a standard shipping container, sometimes referred to as an intermodal container or an ISO container. One skilled in the art will be aware that there are various standards setting out standardised requirements for shipping containers for transport. The shipping container may therefore conform to one of a set of standard dimensions and/or conform to, at least part of a relevant ISO standard for shipping/intermodal containers, such as the dimensions referred to in ISO 3646.

One skilled in the art will appreciated that ISO compliant shipping containers are available in a range of sizes, however many such containers are based on a standard length of 20 ft (6.1 m), with single length or double length (40 ft or 12.19 m) containers being known. Indeed container capacity may be commonly expressed in TEUs (twenty-foot equivalent units). A current standard height of 8 ft 6 in (2.59 m) is known, although again other heights are possible, and a width of 8 ft (2.44 m) is also common, but again other widths are known.

In one embodiment the shipping container may therefore be a single TEU container or a double TEU container, i.e. with a 20 ft length or with a 40 ft length (and height and width in the standard ranges).

The present inventors have appreciated that by using a conductive enclosure to enclose a breaker circuit and by connecting the conductive enclosure to a node of the breaker circuit, it is possible to install a breaker circuit which is rated for a voltage of the order of 80 kV or so in a standard sized shipping container, e.g. a 20 ft long, 8 ft wide shipping container and that the breaker circuit can be installed and safely used in such a shipping container in an HVDC system (provided that it is connected to sufficient other modules so that the total equivalent breaker is rated for the nominal voltage of the DC system). The fact that a breaker module for HVDC, i.e. for use in series with other modules for voltages of the order of say 3000 kV or more, can be installed for correct operation within a standard sized shipping container, i.e. fits within such an enclosure. One skilled in the art would not normally consider that something the size of a shipping container could safely enclose HVDC components and provide sufficient electrical clearance or sufficient insulation.

It should be noted that shipping containers typically have sharp corners and this may result in a high electric field at the points if the containers are connected at high electric potential. To reduce this issue, during installation, corona rings can be added to the external profile of the metallic enclosure 202 in order to round off the sharp edges. Again, the corona rings could be shipped separately from the breaker modules and fitted in place on site.

As illustrated in FIG. 1, breaker circuit 100 comprises a plurality of surge arresters 108. In some embodiments, the surge arresters 108 are contained within the module 200. In some embodiments however, the surge arresters 212 may be mounted on the roof of metallic enclosure 202, in order to limit the risk of damage to the other circuit components in the event of a discharge or explosion. Electrical connections to such externally mounted surge arresters could be made from the outside of the bushings 206, or alternatively they could be made to the metallic enclosure. Insulating supports may be used to separate the bushings from the enclosure, or alternatively, the surge arresters may be mounted such that one terminal of the arrester is directly connected to the metallic enclosure. Any surge arresters 108 that are to be mounted on the roof of metallic enclosure 202 may be shipped separately from module 200 and assembled on site (in a similar fashion to the bushings 206 described above). The surge arresters may not be substantially enclosed. However in some installations the surge arresters may be located within an enclosure, which may for instance be a wire mesh or the like. Such wire mesh may be electrically connected to the metallic enclosure such that the arresters are at the same voltage as the wire mesh enclosure. This may have the advantage of ensuring the local DC electric fields are low in order to prevent dust build up on the arresters.

The modules of embodiments of the present invention may thus be at least partly assembled at a first location for transport to the site where the DC breaker is required. The breaker circuit and insulating supports can be assembled in the enclosure and thus the breaker module can thus be tested when manufactured. The modules can then be transported to the required location. The enclosure can protect the breaker circuit during transport.

During transport of the modules, additional bracing may be provided between the breaker circuit 100 and the metallic enclosure 202 to help protect the breaker circuit from damage caused by, for example, mechanical shock or vibration. It is envisaged that wall bushings 206 would be removed after test and before transport and replaced with blanking plates and that any transport braces would be added after testing and in preparation for transport. As the enclosure may comprise a standard shipping container the transport of the modules may be relatively straightforward.

On site, the module would be installed by removing the transport bracing and removing and replacing relevant blanking plates with wall bushings 206. Each module would then be lifted onto an insulating pedestal. Once in place, any external surge arresters would be fitted and then corona shields would finally be fitted to the top and bottom of the container to control the electric field around the structure.

As described above, FIG. 2a illustrates a single breaker circuit within the enclosure wherein the enclosure is, in use, linked to a node, such as a terminal node of the breaker circuit. As mentioned this breaker circuit may for instance have a rated voltage of about 83 kV and may be housed, for example, in a 20 ft container. Such a module will be referred to herein as a 'single module'. In some embodiments and with some breaker technology, and in particular with developments in breaker technology, it may be possible to assemble a breaker module with a higher voltage rating within a 20 ft container, for instance it may be possible to assemble a 167 kV rated breaker module in a single 20 ft container.

Larger containers, for example a 40 ft container, would be able to house breakers with higher rated voltages that contain more IGBT elements. Clearly however the greater the voltage rating of the breaker the greater the voltage difference across the breaker in use and thus the greater electrical clearance which would be required within the enclosure. This could potentially limit the voltage rating of the breaker circuit that could be used.

Figure 2B:
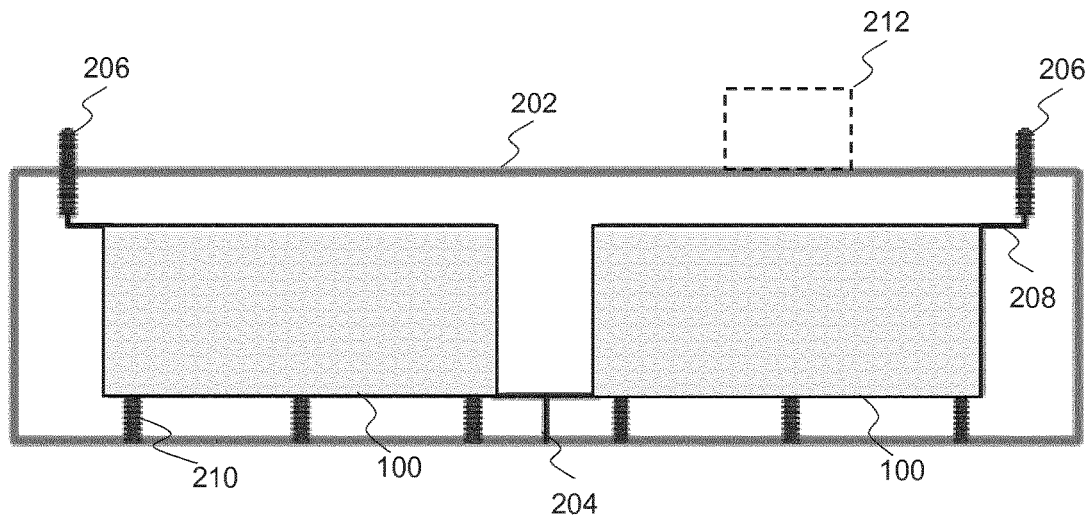
FIG. 2b illustrates a double breaker module.

It has been appreciated by the present inventor(s) however that it is possible to limit the electrical clearance required by splitting the breaker circuit into two distinct breaker circuits, connected in series. By connecting the conductive enclosure to a node at the connection point between the two breaker circuits, e.g. at the midpoint between the two breaker circuits 100, the clearance required is limited. For example FIG. 2b shows two breaker circuits 100 contained within a single conductive enclosure 202. Each of these breaker circuits may be rated for a voltage of about 83 kV and connected in series to create a module rated for 167 kV. This may be referred to as a 'double module'. In the double module shown in FIG. 2b, metallic enclosure 202 is configured to be connected to a node at the midpoint or connection point of the two breaker circuits 100 via a connection 204 such that, when in use, the metallic enclosure 202 is at the same voltage potential as the mid-point of the two breaker circuits 100.

For a single breaker module such as that shown in FIG. 2a were the rated voltage of the breaker circuit to be 167 kV say, then the electrical clearance required within the enclosure would be related to the TIV associated with the full 167 kV rated voltage, i.e. 250 kV.

However, if the 167 kV is split into two 83 kV breaker circuits 100 connected in series and connected the metallic enclosure 202 at the midpoint between the two breaker circuits, as shown in FIG. 2b, the rated voltage of the breaker module is still 167 kV, however the clearance required is significantly reduced. This is because the required clearance is related to the voltage drop across each individual breaker circuit 100, i.e. related to a TIV of 125 kV as opposed to 250 kV and hence the clearance required is reduced.

The physical size of breaker modules and the size of metallic enclosure 202 can therefore be reduced by splitting larger breaker circuits 100 into smaller breaker circuits connected in series and connected to the metallic enclosure at the midpoint of the breaker circuits.

The use of an 83 kV breaker circuit as a building block to create larger circuit breakers also has in an embodiment the advantage of standardising the breaker circuits used in the modules.

It will be appreciated that these voltage ratings are for illustration only and that other combinations of voltage ratings may be used. For instance, the two breaker circuits 100 in the double module could have the same voltage rating, or they could have different voltage ratings. Furthermore, the number of breaker circuits contained within a module is not limited to one or two, rather, any number of breaker circuits could be contained in metallic enclosure 202, providing the enclosure is large enough to provide sufficient clearance between the breaker circuit(s) 100 and the walls of the metallic enclosure 202.

As noted above, the conductive, e.g. metallic, enclosure 202 is configured to be connected to a node at the midpoint of the two breaker circuits 100 via a connection 204 such that, when in use, the metallic enclosure 202 is at the same voltage potential as the mid-point of the two breaker circuits 100. Alternatively, the connection 204 may connect the walls of metallic enclosure 202 to a terminal of the module that electrically connects the module to an external circuit, or to some other node that is at a voltage potential associated with the breaker circuits 100. In all embodiments, the purpose of electrical connection 204 is to ensure that in normal use, the metallic enclosure 202 is at the same (or a closely related or similar) potential as the enclosed breaker circuitry. Embodiments have the aforementioned advantages of reducing the required electrical clearance, enabling metallic enclosure 202 to be reduced in size, to the dimensions of a shipping container. Furthermore, it reduces the effect of electrostatic precipitation and the build-up of dust.

In the embodiment shown in FIG. 2b, metallic enclosure 202 includes two wall bushings 206 that allow two connections 208 to pass through metallic enclosure 202 such that the breaker module can be connected in an electrical path with a circuit external to metallic enclosure 202. The bushings may be placed at either end of the container, or at some other position on metallic housing 202. The bushings may be located at opposite ends of the container in order to allow one or more modules to be conveniently connected whilst being placed side by side. Alternatively, a first bushing may be positioned to allow a connection to be made through the upper wall of metallic enclosure 202 and a second bushing may be positioned to allow a connection to be made through the floor of metallic enclosure 202, in order to enable the modules to be easily connected whilst being stacked. In the embodiments described above, a 125 kV voltage rating is needed for the bushings and as a result, the bushings can be compact.

Again the enclosure 202 may comprise a standard shipping container, for instance an intermodal container conforming to an ISO standard such as ISO 3646. Furthermore enclosure 202 may have any of the characteristics of the enclosure 202 described above with respect to the single module illustrated in FIG. 2a.

In a similar manner to the previous embodiment outlined in relation to FIG. 2a, the double module of FIG. 2b may require corona rings to be installed in order to smooth the corners of the metallic enclosure in order to prevent a high concentration of electric field lines developing in the corners of the module, particularly if metallic enclosure 202 is a standard shipping container. Along with the aforementioned bushings, the corona rings can be transported separately from the double modules and installed on site.

Figure 3:
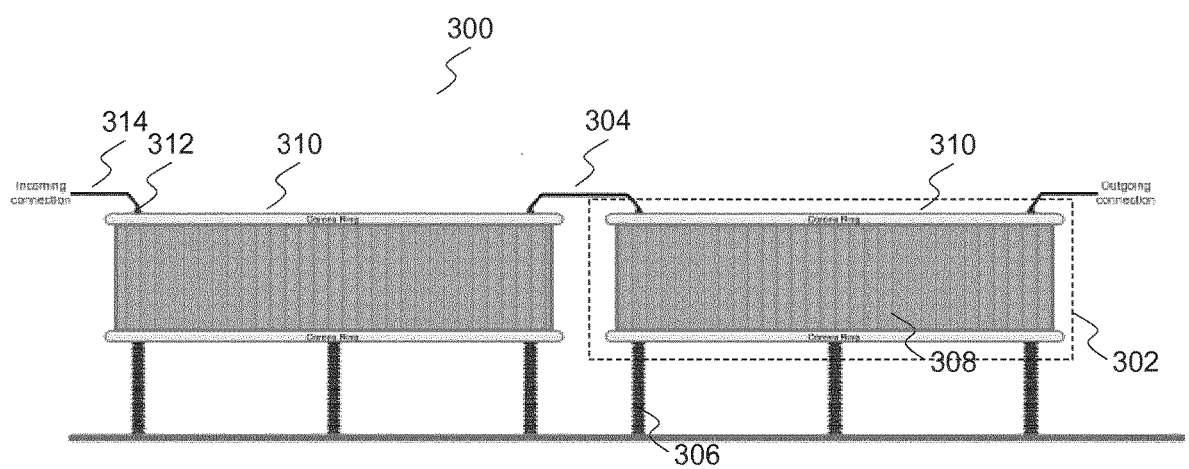
FIG. 3 illustrates an example of a 320 kV breaker comprising two 167 kV breaker modules connected in series.

FIG. 3 illustrates a modularised 320 kV breaker in use. The breaker 300 consists of two 167 kV 'double modules' 302 as described above and illustrated in FIG. 2b. The modules are connected in series by a linking connection 304. Each module includes a metallic enclosure 308 in the form of a standard shipping container, mounted on a plurality of insulating pedestals 306 to prevent electrical discharges. Each module 302 is fitted with corona rings 310 to smooth the profile of the electric field at the corners of the shipping containers. Furthermore, bushings 312 enable electrical connections 314 to pass through the metallic enclosure 308 to electrically connect the breaker to an external system.

The modules may be delivered onsite with bushings 312 and corona rings 310 removed. Bushings 312 would be replaced with blanking plates during transportation. During installation of the breaker 300, any transport bracing internal to each module would be removed and the blanking plates would be replaced with wall bushings 206. Each module would then be lifted onto insulating pedestals 306. Finally, the corona rings 310 would be fitted to the top and bottom of the module to control the electric field around the structure.

Whilst embodiments of the invention has principally been described in terms of the hybrid breaker, it will be appreciated by the skilled person that the principles described above are also applicable to other types of circuit breakers.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A DC breaker module suitable for use in a high voltage DC circuit comprising:
   at least a first breaker circuit enclosed within a conductive enclosure, the first breaker circuit comprising one or more semiconductor switches and a mechanical breaker connected in series;
   the conductive enclosure being configured such that, in use, the first breaker circuit can be connected in an electrical path with a circuit external to the conductive enclosure; and
   wherein the conductive enclosure is further configured to be connected to a node of the electrical path such that, in use, the conductive enclosure is at the same voltage potential as the node of the electrical path.

2. The DC breaker module of claim 1, wherein the conductive enclosure is configured to be connected to either an input node of the first breaker circuit or an output node of the first breaker circuit.

3. The DC breaker module of claim 1, wherein the DC breaker module is housed in a structure that conforms to dimensions of an ISO standard shipping container.

4. The DC breaker module of claim 1, wherein the conductive enclosure is formed within or from a shipping container.

5. The DC breaker module of claim 1, wherein at least one wall of the conductive enclosure forms at least part of a shipping container.

6. The DC breaker module of claim 1 further comprising a second breaker circuit within the conductive enclosure, the first and second breaker circuits being connected in series, the conductive enclosure being configured such that, in use, the second breaker circuit can be connected in said electrical path with the first breaker circuit.

7. The DC breaker module of claim 6, wherein the conductive enclosure is configured to be connected to a node at a connection point between the first and second breaker circuits.

8. The DC breaker module of claim 1, wherein the conductive enclosure comprises at least one connection site for connecting electrical bushings to allow an electrical connection between the first breaker circuit in the electrical path with a circuit external to the conductive enclosure through walls of the conductive enclosure.

9. The DC breaker module of claim 1, wherein the DC breaker module comprises at least one insulating support member for supporting the first breaker circuit within the conductive enclosure in use.

10. The DC breaker module of claim 1, wherein the first breaker circuit and/or the conductive enclosure comprises one or more mounting points for mounting at least one removable bracing member for supporting circuitry when not in use.

11. The DC breaker module of claim 1 further comprising corona rings fitted to the conductive enclosure.

12. The DC breaker module claim 1, wherein the first breaker circuit comprises a hybrid breaker circuit comprising a main path and an auxiliary path wherein the auxiliary path comprises a plurality of semiconductor switches connected in series and the main path comprises the one or more semiconductor switches and the mechanical breaker connected in series.

13. The DC breaker module of claim 12 comprising at least one mounting point on the outside of said conductive enclosure for mounting one or more surge arresters on the outside of the conductive enclosure in parallel with the plurality of semiconductor switches of the auxiliary path.

14. The DC breaker module of claim 1, wherein the DC breaker module is contained in a circuit breaker suitable for use in a high voltage DC system, and the high voltage DC system further comprises a plurality of DC breaker modules wherein the plurality of DC breaker modules are connected in a series.

15. A method of forming a DC breaker comprising: taking a plurality of DC breaker modules wherein each DC breaker module comprises a DC breaker circuit in a conductive enclosure;
    connecting the DC breaker circuits of said DC breaker modules in series; and
    connecting each conductive enclosure of a DC breaker module to a node of a respective DC breaker circuit.

\* \* \* \* \*